United States Patent [19]
Talbot et al.

[11] Patent Number: 5,768,870
[45] Date of Patent: Jun. 23, 1998

[54] FINGER ANGLE ADJUSTMENT OF A PICKUP REEL OF A CROP HARVESTING HEADER

[75] Inventors: Francois Talbot, Winnipeg; Rheal G. Remillard, St. Joseph, both of Canada

[73] Assignee: MacDon Industries, Winnipeg, Canada

[21] Appl. No.: 677,680

[22] Filed: Jul. 8, 1996

[51] Int. Cl.$^6$ ..................................................... A01D 57/04
[52] U.S. Cl. ............................... 56/364; 56/220; 56/221; 56/227
[58] Field of Search ............................. 56/120, 130, 220, 56/221, 226, 227, 364

[56] References Cited

U.S. PATENT DOCUMENTS

| | | | |
|---|---|---|---|
| 3,599,410 | 8/1971 | De Coene | 56/221 |
| 3,945,180 | 3/1976 | Sinclair | 56/221 |
| 4,008,558 | 2/1977 | Mott | 56/226 |
| 4,622,805 | 11/1986 | Johnson et al. | 56/220 X |
| 4,776,155 | 10/1988 | Fox et al. . | |
| 4,835,953 | 6/1989 | Naaktgeboren et al. | 56/220 X |
| 4,936,082 | 6/1990 | Majkrzak | 56/220 |
| 5,007,235 | 4/1991 | Nickel et al. | 56/220 X |

*Primary Examiner*—Terry Lee Melius
*Assistant Examiner*—Thomas A. Beach
*Attorney, Agent, or Firm*—Adrian D. Battison; Murray E. Thrift

[57] ABSTRACT

A crop harvesting header includes a reel mounted on a pair of forwardly extending arms carried on a header frame above a table and cutting knife. The reel is rotatable about a longitudinal axis and includes bats with fingers which pivot each about a respective bat axis so the angle of the fingers varies as the reel rotates. The angle of the fingers can be varied to increase and decrease the angle at the knife. The arms include a forward portion which is arranged at an angle to a main portion so as to be inclined downwardly and forwardly therefrom. As the reel supports on the arms is moved forwardly along the arms and engages onto the forward portion, the reel is moved downwardly and forwardly which simultaneously changes the angle to provide a more aggressive action as the reel is moved forwardly of the knife.

13 Claims, 5 Drawing Sheets ical-axis-containing-the-main
FINGER ANGLE ADJUSTMENT OF A PICKUP REEL OF A CROP HARVESTING HEADER

BACKGROUND OF THE INVENTION

This invention relates to a crop harvesting header of the type comprising a frame for mounting on a crop harvesting machine for movement across ground carrying a crop to be harvested, the frame defining a working width of the header, a table mounted on the frame across the width of the header for receiving the crop when cut for transportation along the header, a cutting knife along a front edge of the table for cutting the crop and a pickup reel comprising a main elongate support beam, a plurality of bats at angularly spaced positions around the main beam, a pair of support arms carried on the frame and extending forwardly therefrom for supporting the beam at a forward end of the arms and means for adjusting the bat angle and the fingers carried thereby relative to an axial plane containing the main longitudinal axis of the beam and a bat pivot axis.

A reel of this type is shown in U.S. Pat. No. 4,776,155 and related U.S. Pat. No. 4,752,809 both of which are assigned to the present assignee. The second of the above patents is particularly directed to the bat angle adjustment system which controls the angle of the bats as they rotate about the main longitudinal axis of the beam so as to maintain an angle of the bats relative to a vertical plane through the bat substantially constant as the bats move through the region adjacent the cutting knife. This bat control system includes an eccentrically mounted control disc which is shaped and arranged to provide the necessary advancement and retardation of the fingers of the bat as the bat rotates about the main longitudinal axis of the beam.

While the above patents do not show these details, it is well known that the reel is adjustable so as to vary the height of the reel by pivoting the support arms about their point of connection to the frame. Furthermore the position of the reel along the length of the support arms is adjustable so as to move the reel and particularly the bats forwardly and rearwardly relative to the cutting knife for different crop conditions. Yet further, it is also possible to adjust the angle of the fingers, relative to a vertical plane passing through each bat axis, which is maintained constant as the bat passes through an arc adjacent the knife. These adjustments are shown in the photograph and briefly described in a brochure by John Deere entitled "Hillside Combine".

In particular, in this brochure on page 7 is shown an arrangement in which a sleeve carrying the main beam of the reel can slide forwardly and rearwardly along an inclined portion of the support arm. In addition the same photograph shows the adjustment of the finger angle which is achieved by pivoting the bat angle control system and the main axle of the reel about a pivot pin carried on the sleeve underneath the support arm. This pivotal movement is effected manually and is intended to be initially set before the equipment enters the field. However this pivotal movement does act to simultaneously adjust the constant angle of the bats while moving the main axle relative to the support arm fore and aft over the knife.

However the main adjustment in the field is intended to be the sliding movement of the sleeve along the support arm and this sliding movement does not have any effect on the angle of the fingers.

SUMMARY OF THE INVENTION

It is one object of the present invention to provide an improved header which allows the position and angle of the fingers to be adjusted simultaneously in field operation so that the angle of the fingers is increased as the reel axis is moved forwardly to improve crop pickup in conditions where aggressive pickup action is required.

According to one aspect of the invention there is provided a crop harvesting header comprising: a frame for mounting on a crop harvesting machine for movement across ground carrying a crop to be harvested, the frame defining a working width of the header; a table mounted on the frame across the width of the header for receiving the crop when cut for transportation along the header; a cutting knife along a front edge of the table for cutting the crop; and a pickup reel comprising: a main elongate beam extending along the header generally parallel to the cutting knife; at least two reel support arms spaced along the width of the frame, each having a rear end mounted on the frame for vertical pivotal movement providing adjustment for raising and lowering the reel relative to the cutting knife and a forward end for supporting the main elongate beam; means mounting the main beam for rotation about a main longitudinal axis thereof; a plurality of elongate bats; means mounting the bats at angularly spaced positions around the main elongate beam for rotation therewith; each bat having a plurality of fingers mounted at longitudinally spaced positions thereon for engaging the crop as the bats rotate with the main beam about the main longitudinal axis of the main beam while the crop enters the cutting knife and as the cut crop moves onto the table; means mounting each bat for pivotal movement about a respective bat axis passing through the bat and parallel to the main longitudinal axis for varying an angle of the fingers relative to an axial plane containing the respective bat axis and the main longitudinal axis; bat angle control means for controlling the angle of the fingers of each bat as said each bat rotates around the main longitudinal axis such that an angle of the fingers of each bat to a vertical plane containing the respective bat axis is maintained approximately equal to a predetermined angle as the bat is rotated from a first angular position of the bat adjacent the cutting knife to a second angular position of the bat rearward of the first position; beam support means mounting the main elongate beam on the support arms for sliding adjustment movement forwardly and rearwardly on the support arms so as to adjust the horizontal position of the beam relative to the cutting knife; and means responsive to the forward sliding movement of the main elongate beam along the support arms for simultaneously and automatically increasing said predetermined angle.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
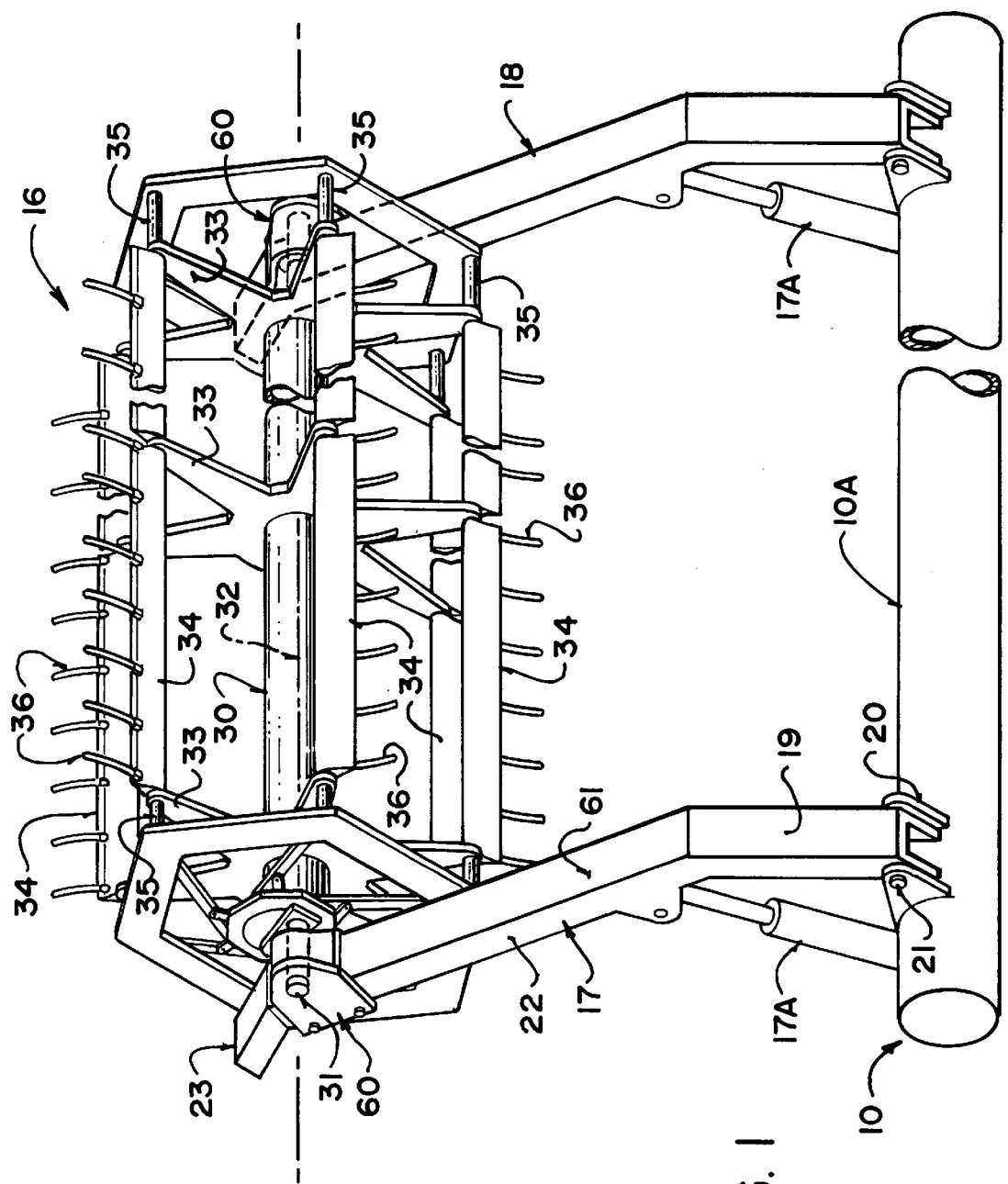
FIG. 1 is a schematic illustration of a pickup reel according to the present invention showing the reel and the support arms therefor.
Figure 2:
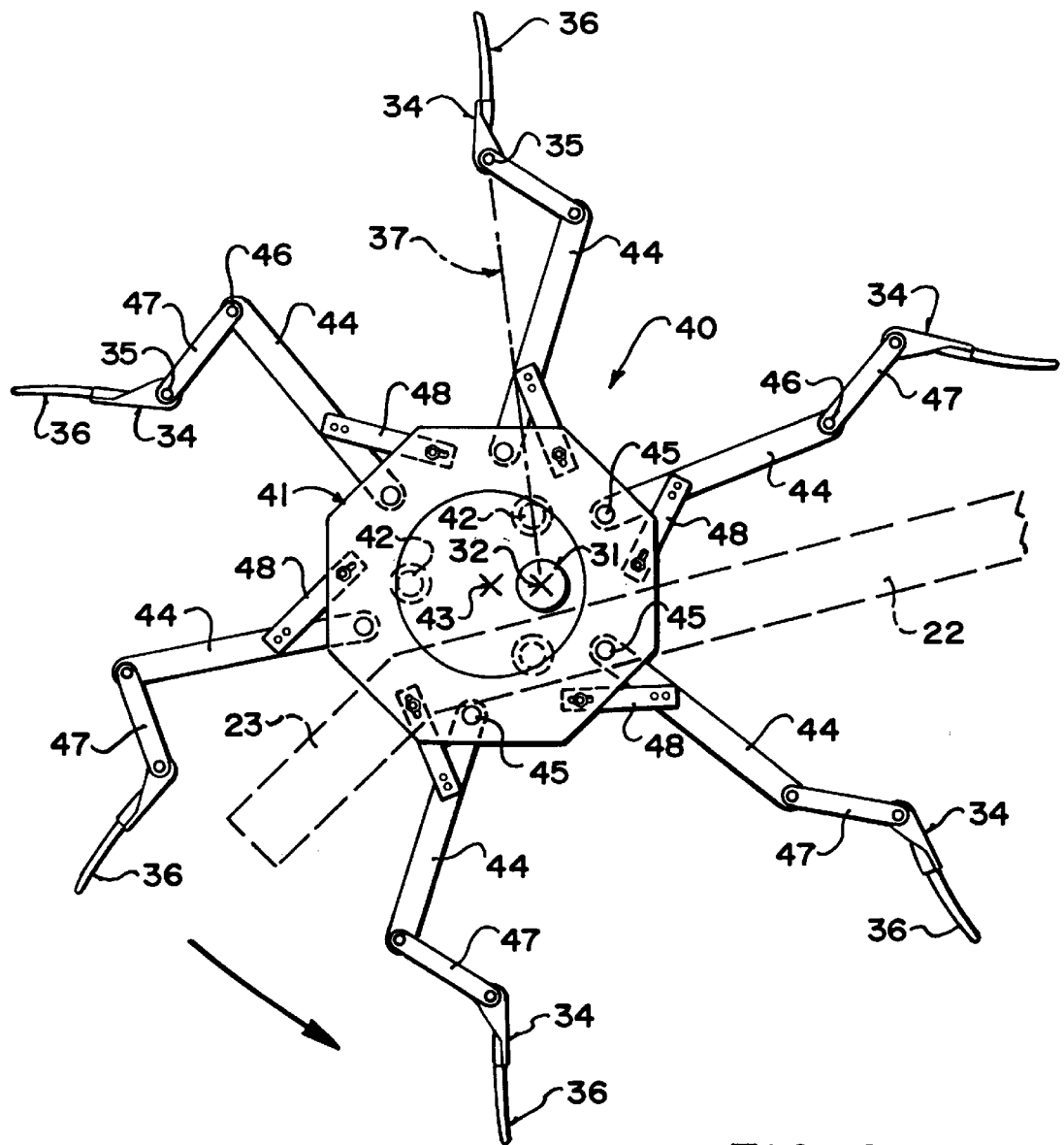
FIG. 2 is a vertical cross sectional view through the bat angle control system of the reel of FIG. 1.
Figure 3:
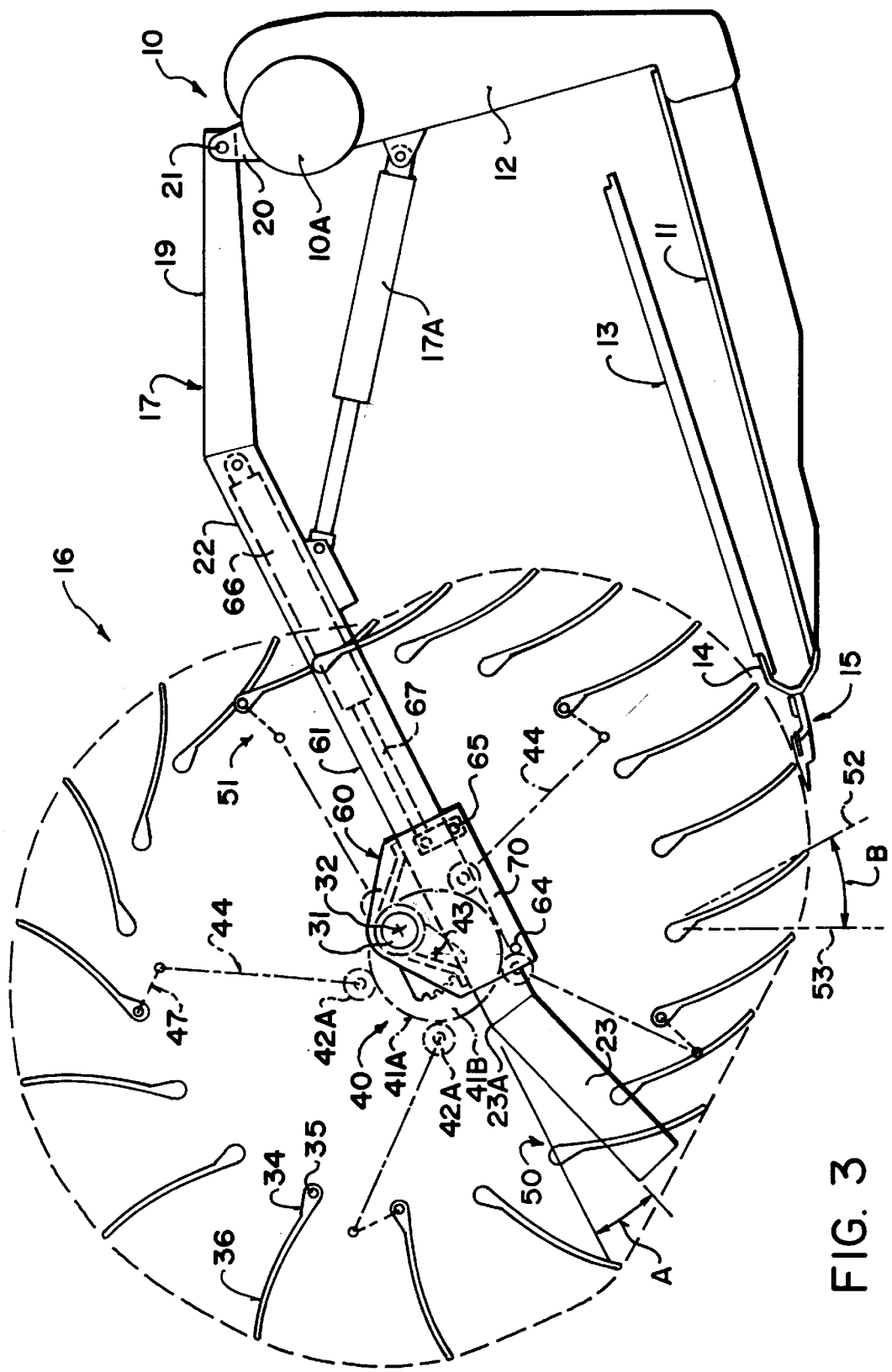
FIG. 3 is a side elevation view of the header according to the present invention in a retracted position of the reel axis relative to the support arm pivot, the bat angle control system being modified relative to that of FIG. 2.

FIGS. 1, 2 and 3 show schematically the general layout of the header according to the present invention. Thus the header comprises a main frame generally indicated at 10 including a main longitudinal beam which extends across the full width of the frame and defines the width of the header. The frame further includes a table 11 which is mounted downwardly and forwardly of the main tube 10A and supported on the main tube by a plurality of braces 12 (omitted in FIG. 1 for convenience of illustration). On top of the table 11 is mounted a draper or other conveyor 13 which carries the cut crop material along the header for discharge. At the front of the table is provided a knife support bracket 14 in the form of a generally U-shaped channel facing forwardly of the table. On the bracket 14 is mounted a sickle knife 15 which extends across the full width of the table and acts to cut a standing crop as the header is moved across the ground carrying the crop.

The construction of the reel is substantially the same as that shown and described in U.S. Pat. No. 4,776,155 of the present Assignees and a part of FIG. 2 herein is taken from that patent for convenience of illustration and to provide a brief description of the construction of the reel. However the reel can vary in design and is well known to one skilled in the art and therefore will not be described in full detail.

The reel comprises a main elongate beam 30 in the form of a cylindrical tube which is mounted on an axle 31 which is mounted so as to allow rotation of the beam 30 about a main longitudinal axis 32 of the beam. The beam carries a plurality of star shaped support elements 33 at spaced positions along the length of the beam with each support element having a number of arms equal to a number of bats 34 carried by the main beam 30. Each bat includes a support shaft 35 which is mounted in a bearing at the end of a respective arms. On the shaft is mounted a bat comprising an elongate body which supports a number of fingers 36 at longitudinally spaced positions along the length of the bat which project from the bat generally outwardly away from the axis 32.

The bat shafts 35 and their longitudinal axis thus rotate about the axis 32. At the same time each bat pivots about its respective shaft 35 so as to provide a variation in the angle of the fingers 36 relative to an axial plane 37 joining the axis 32 and the shaft 35. The intention in the movement is maintain the bat fingers mutually parallel at least as they move through the working zone in which they contact the crop and more preferably throughout the full rotation around the reel axis. In order to achieve this, it is of course necessary that the bat fingers constantly adjust in angle relative to the axial plane passing through the respective bat axis.

The control in the movement of the bats is provided by an eccentric drive system generally indicated at 40. In FIGS. 1 and 2, the eccentric drive system comprises a disc 41 carried on a plurality of cams 42 which are located eccentrically relative to the axis 32 on a suitable support member. The disc 41 is thus free to rotate around its axis 43 which is offset from the axis 32. The disc carries a plurality of links 44 which extends from a pivot pin 45 on the disc to a pivot coupling 46 at an inner end of a bat pivot arm 47 rigidly connected to the bat for rotation therewith. Thus each link 44 pulls and pushes on the arm 47 of the respective bat to pivot the bat about its shaft 35.

In FIG. 2 the star shaped supports 23 are omitted for convenience of illustration. In FIG. 3 the links and bat crank arms 47 are omitted for convenience of illustration. Tie links 48 are connected between each link 44 and the disc so as to hold the link against forward and rearward movements beyond predetermined limits with the links 48 having a slot shaped connection to the disc allowing a change of angle of the link relative to the disc to accommodate the movement of the bats.

As previously described in the above patent, this bat angle control system generally indicated at 40 provides advancement and retardation of the angle of the fingers 36 at different positions around the axis 11. In FIG. 2, the bat control system includes the rotating disk 41 mounted on the plurality of guide rollers 42 so that the disk in effect forms a rotating cam mounted on stationary cam followers defined by the rollers. In FIG. 3, the arrangement is in effect reversed in that a stationary cam guides rotating cam followers 41A with those cam followers or rollers acting to drive the links 44 and 47 (shown only schematically).

FIG. 3 shows the different angles of the bats at twenty positions around the axis 32. The number of bats can vary but generally a pickup of this type will have a number of bats of the order of five or six. In FIGS. 1 and 3 five such bats are shown. In FIG. 2, six bats are shown.

It will be noted therefore from FIG. 3 that the eccentric location of the axis 43 of the cam 41A causes the fingers to be at a maximum advanced position at the position indicated at 50 and that a maximum retarded position at the position indicated at 51. In between these positions the fingers remain substantially parallel as the bats move or sweep between these two positions. Thus it will be noted that the bats have an angle B as indicated at the line 52 relative to a vertical plane 53 extending through the bat at each position around its movement. The angle B remains substantially constant between the positions 50 and 51. The position 50 is located forwardly of the knife 15 and the position 51 is rearward of the position 50 and generally rearward of the knife 15.

Each end of the shaft 31 is mounted in a bearing 32A. The cam 41A includes a flat disk 41B which is circular and is carried on bearing 32A so as to remain stationary as the shaft 31 rotates, the disk 41B being attached to the bearing 32A via an adjustment plate 54 fixed to the bearing. The position of the cam 41A relative to the axis 32 of the shaft 31 can be adjusted manually by rotating the adjustment plate 54 relative to the disk 41B. Thus the cam 41A is rotated about the axis 32 by selecting one of the slots in the plate 54 and locating a pin in that selected slot to hold the disk 41B connected to the plate 54 in fixed position when the adjustment is complete. This adjustment, which is a manual adjustment and intended to be effected prior to entry into the field with the equipment, adjusts the angular orientation of the bat angle control system 40 about the axis 32. This adjustment therefore varies the locations of the positions 50 and 51 and also varies the angles B of the fingers as they sweep over the area of the cutting knife.

The pickup reel 16 is carried on the main frame 10 by a pair of forwardly extending arms 17 and 18 which support the pick up reel in position generally above the knife 15. The support arms 17 and 18 are pivoted at their rear end 19 on the main tube 10A by a pair of devises 20 and a transverse pin 21 with the pivotal movement being effected by a pair of hydraulic cylinders 17A.

Each of the arms 17 and 18 includes the rear generally horizontal coupling portion 19 which connects to the support frame, a main forwardly and downwardly inclined portion 22 and a forwardmost portion 23 which is inclined forwardly and downwardly at a sharper angle than the main portion 22.

The support arm 17 defines a support surface for a slide member 60 movable along the support arm. As illustrated the support surface is defined by an upper surface 61 of an inverted channel member defining the support arm. The slide member 60 is thus supported on the upper surface 61 so the weight of the reel is applied through the slide plate 60 onto the upper support surface 61.

Figure 4:
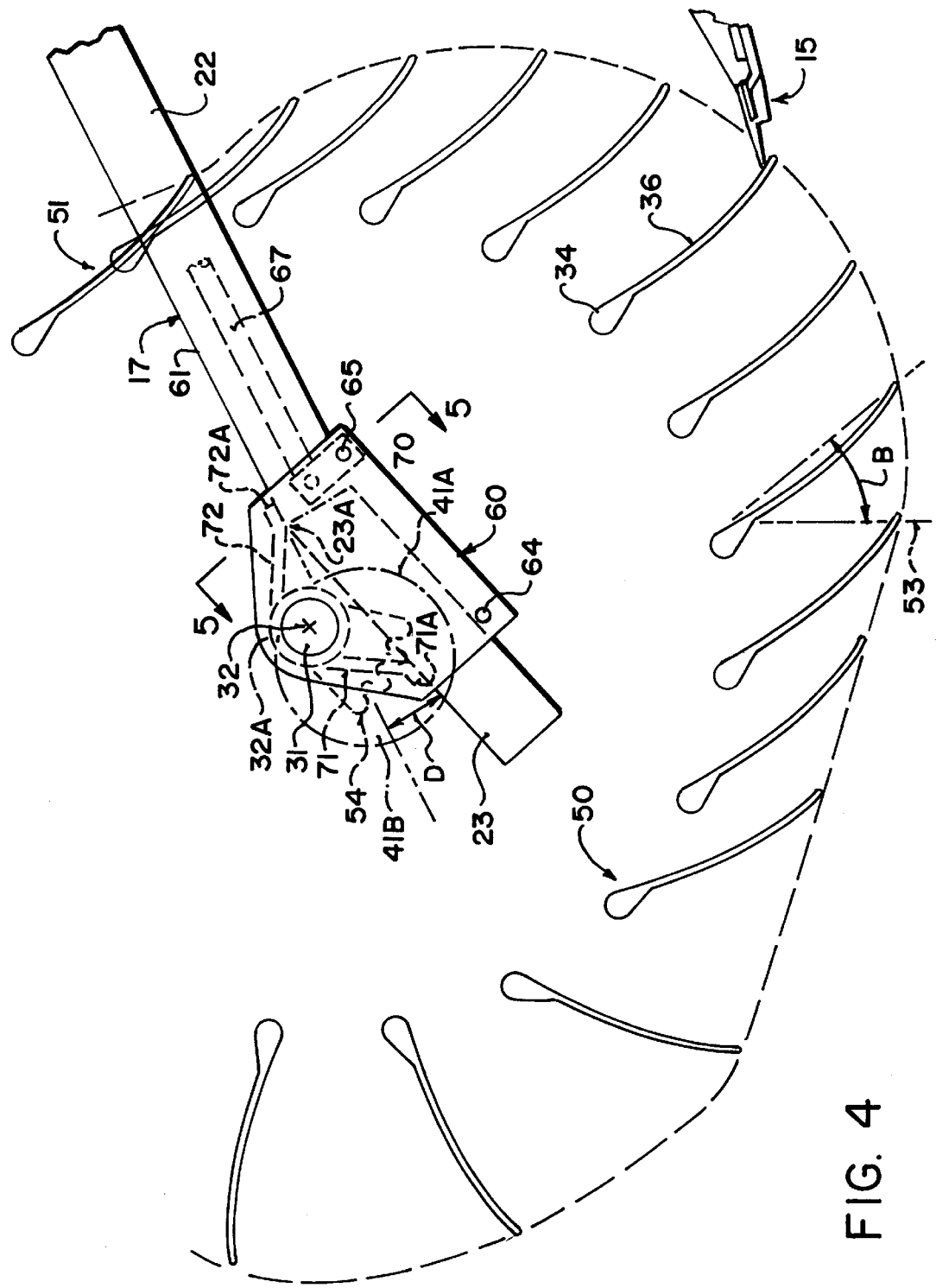
FIG. 4 is a partial side elevational view similar to that of FIG. 3 showing the reel axis in a forward position relative to the support arm pivot in which the axis is moved forwardly and downwardly and the finger angle is increased.
Figure 5:
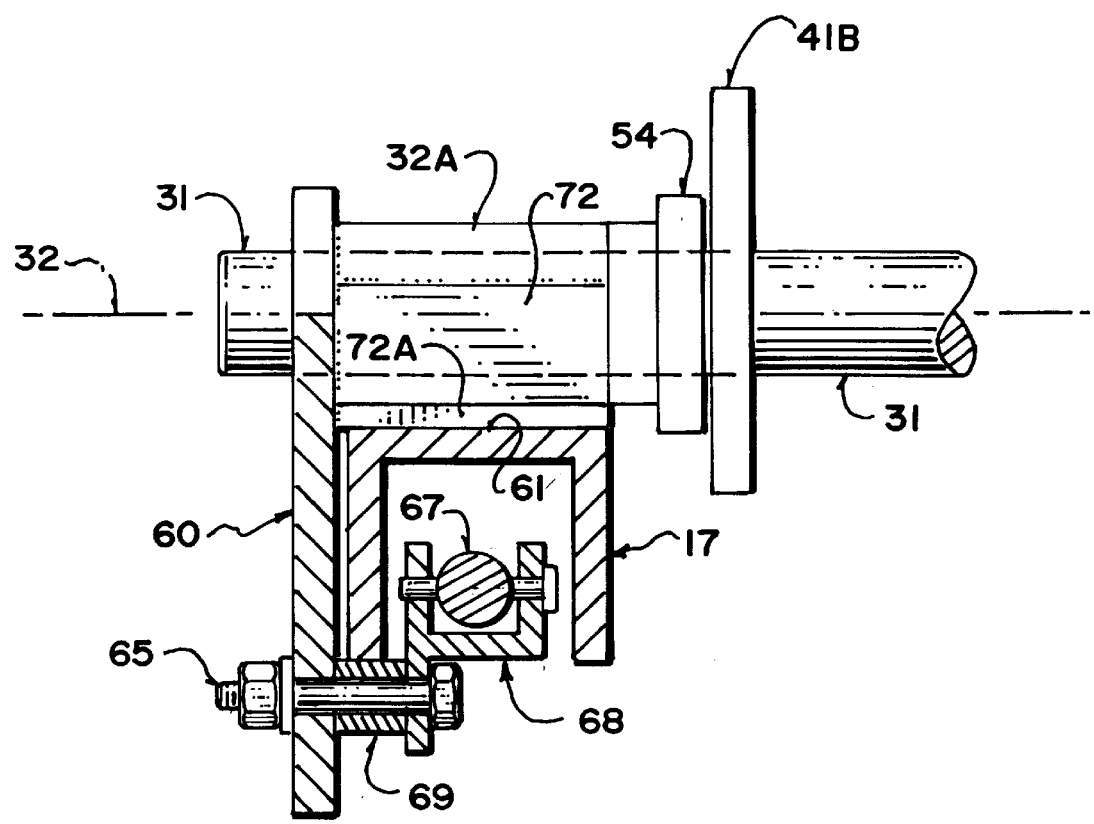
FIG. 5 is a cross-sectional view along the lines 5—5 of FIG. 4.

As best shown in FIGS. 4 and 5, the slide member 60 comprises an end plate 70 which forms a vertical plate parallel to one side wall of the channel member forming the respective support arm. The plate 70 carries on its inside surface the bearing 32A for the shaft 32 so that the shaft 32 projects through a hole in the plate above the support surface 61 of the support arm. The bearing 32A is carried in a pair of support plates 71 and 72 which have an upper end attached to the bearing 32A and extend downwardly and outwardly therefrom to form lower curved ends 71A and 72A which sit on the top surface 61 of the support arm. Thus the lower end 71A of the plate 71 is positioned forwardly of the axis 32 of the shaft 31 and the lower end 72A of the plate 72 is positioned rearwardly of the axis 32. These lower ends therefore provide support points for resting on the surface 61 and communicating forces from the bearing and the plate 70 downwardly onto the support surface 61.

The slide member defines a forward contact point 71A and a rearward contact point 72A which define points of engagement with the support surface 61. Two retaining pins 64, 65 located underneath the support arm hold the structure in position on the support arm. The slide member thus provides two top points of contact with the support arm with the orientation of the slide member being controlled by the height of the contact points on the side member.

The support surface 61 is defined along a major part of the main portion 22 of the arm and also along an upper surface of the downwardly inclined forwardmost portion 23 of the arm. The slide member is moved forwardly and rearwardly by a hydraulic cylinder 66 with a piston rod 67 located on the support arm within the channel shape for engaging and sliding the slide member along the support arm. The end of the rod 67 is attached to the pin 65 by a clevis 68 and the pin 65 carries a bushing 69 to run against the underside of the support arm 17. It will be appreciated that each of the arms includes a slide member 60 substantially of the arrangement described above. In one arrangement, both slide members include a cam 41A and related elements as described. In another arrangement, the cam is located only at one side and the opposed slide member is thus less complicated but still acts to support the bearing as described. In this arrangement, the drive to the shaft (not shown) can be located at the opposed end.

In field operation, the angle of the fingers is initially set by manipulation of the adjustment plate 54 relative to the disk 41B. The position of the reel can then be adjusted in the field condition by actuating the cylinder 66 to move the slide member forwardly and rearwardly. As the slide member moves forwardly and rearwardly over the main portion 22 of the arm, the slide member follows the upper support surface 61 so that it is moved forwardly and slightly downwardly as it slides along the main portion. However as the main portion is straight, the relative heights of the contact points 71A and 72A remain constant so that there is no change of angle of the bat angle control system 40 as the sliding movement occurs over that main portion.

However when the forward contact point 71A passes over an apex 23A between the main portion 22 and the forward portion 23, the height of the contact point 71A relative to the contact point 72A increases in distance as the contact point 71A begins to move down the upper surface of the portion 23. The upper surface of the portion 23 is similarly straight and set as an angle A relative to the main portion 22. This movement of the front contact point 71A onto the portion 23 thus increases the rate of downward movement of the whole reel as it is moved forwardly. At the same time the angular orientation of the bat angle control system 40 as controlled by the cam 41A is angularly rotated, with the bearing 32A and the plate 70, about the axis 32.

This movement is illustrated in FIG. 4 where it will be noted that the forward contact point 71A has moved part way along the portion 23 so that it is moved downwardly by a distance D thus causing a rotation of the cam 41A about the axis 32. This rotation provides an increase in the angle B of the fingers relative to the vertical plane 53.

Thus it will be noted from comparing FIGS. 3 and 4 that the bats have been moved forwardly and downwardly so that the fingers extend to a position below the knife 15 and further forward of the knife 15. The angle B is then increased from the initial angle of the order of 30° in FIG. 3 to an increased angle of the order of 50° in FIG. 4.

The rotation of the reel and its bat angle control system by the above adjustment also ensures that the fingers remain in a position sweeping closely adjacent to the knife without interfering with the knife.

The slope or portion 22 of the support arms is arranged so as to maintain approximately equal clearance between the reel fingers and the knife and the conveyor as the slide members are moved over that portion. In addition, as the slide members move yet further forwardly onto the portion 23, the axis 32 tends to rotate about an axis at the knife so that the clearance between the fingers and the knife remains substantially constant as the fingers move further forward and further downwardly as shown in FIG. 4.

The increase of the angle B thus significantly increases the aggressiveness of the pickup action which is required for picking up crops in front of the knife which are lying on the ground rather than standing vertically.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A crop harvesting header comprising:
   a frame for mounting on a crop harvesting machine for movement across ground carrying a crop to be harvested, the frame defining a working width of the header;
   a table mounted on the frame across the width of the header for receiving the crop when cut for transportation along the header;
   a cutting knife along a front edge of the table for cutting the crop;
   and a pickup reel comprising:
      a main elongate beam extending along the header generally parallel to the cutting knife;
      at least two reel support arms spaced along the width of the frame, each having a rear end mounted on the frame for vertical pivotal movement providing adjustment for raising and lowering the reel relative to the cutting knife and a forward end for supporting the main elongate beam;

means mounting the main beam for rotation about a main longitudinal axis thereof;

a plurality of elongate bats;

means mounting the bats at angularly spaced positions around the main elongate beam for rotation therewith;

each bat having a plurality of fingers mounted at longitudinally spaced positions thereon for engaging the crop as the bats rotate with the main beam about the main longitudinal axis of the main beam while the crop enters the cutting knife and as the cut crop moves onto the table;

means mounting each bat for pivotal movement about a respective bat axis passing through the bat and parallel to the main longitudinal axis for varying an angle of the fingers relative to an axial plane containing the respective bat axis and the main longitudinal axis;

bat angle control means for controlling the angle of the fingers of each bat as said each bat rotates around the main longitudinal axis such that an angle of the fingers of each bat to a vertical plane containing the respective bat axis is maintained approximately equal to a predetermined angle as the bat is rotated from a first angular position of the bat adjacent the cutting knife to a second angular position of the bat rearward of the first position;

beam support means mounting the main elongate beam on the support arms for sliding adjustment movement forwardly and rearwardly on the support arms so as to adjust the horizontal position of the beam relative to the cutting knife;

and means responsive to the forward sliding movement of the main elongate beam along the support arms for simultaneously and automatically increasing said predetermined angle.

2. The header according to claim 1 wherein the beam support means and the means responsive are arranged such that the angle remains constant for movement over a main portion of the support arms and increases only at a forward most portion thereof.

3. The header according to claim 1 wherein the support arms each include a support surface which is inclined forwardly and downwardly such that said forward movement causes downward movement of the main elongate beam.

4. The header according to claim 3 wherein the support surface at a forwardmost portion is inclined forwardly and downwardly at an increased angle relative to a main portion such that the main elongate beam moves downwardly more quickly at the forwardmost portion.

5. The header according to claim 4 wherein the forwardmost portion is substantially straight and arranged at an angle to the main portion.

6. The header according to claim 1 wherein the bat angle control means is adjustable for adjusting said predetermined angle independently of movement of the main elongate beam along said support arms.

7. A crop harvesting header comprising:

a frame for mounting on a crop harvesting machine for movement across ground carrying a crop to be harvested, the frame defining a working width of the header;

a table mounted on the frame across the width of the header for receiving the crop when cut for transportation along the header;

a cutting knife along a front edge of the table for cutting the crop;

and a pickup reel comprising:

a main elongate beam extending along the header generally parallel to the cutting knife;

at least two reel support arms spaced along the width of the frame, each having a rear end mounted on the frame for vertical pivotal movement providing adjustment for raising and lowering the reel relative to the cutting knife and a forward end for supporting the main elongate beam;

means mounting the main beam for rotation about a main longitudinal axis thereof;

a plurality of elongate bats;

means mounting the bats at angularly spaced positions around the main elongate beam for rotation therewith;

each bat having a plurality of fingers mounted at longitudinally spaced positions thereon for engaging the crop as the bats rotate with the main beam about the main longitudinal axis of the main beam while the crop enters the cutting knife and as the cut crop moves onto the table;

means mounting each bat for pivotal movement about a respective bat axis passing through the bat and parallel to the main longitudinal axis for varying an angle of the fingers relative to an axial plane containing the respective bat axis and the main longitudinal axis;

bat angle control means for controlling the angle of the fingers of each bat as said each bat rotates around the main longitudinal axis such that an angle of the fingers of each bat to a vertical plane containing the respective bat axis is maintained approximately equal to a predetermined angle as the bat is rotated from a first angular position of the bat adjacent the cutting knife to a second angular position of the bat rearward of the first position;

beam support means mounting the main elongate beam on the support arms for sliding adjustment movement forwardly and rearwardly on the support arms so as to adjust the horizontal position of the beam relative to the cutting knife;

wherein each support arm includes a slide member movable therealong with the main elongate beam mounted on respective ones of the slide members at respective ends thereof, the slide members each having a forward engagement point and a rearward engagement point engaging a support surface of the respective arm at spaced positions therealong, the support surface being shaped such that a forward portion thereof is inclined forwardly and downwardly at an increased angle relative to a rearward main portion thereof such that when the forward engagement point passes onto the forward portion it moves downwardly relative to the rearward engagement point.

8. The header according to claim 7 wherein the beam support means and the support arms are arranged such that the angle remains constant for movement over a main portion of the support arms and increases only at the forward portion thereof.

9. The header according to claim 7 wherein the forward portion is substantially straight and arranged at an angle to the main portion.

10. The header according to claim 7 wherein the bat angle control means is adjustable for adjusting said predetermined angle independently of movement of the main elongate beam along said support arms.

11. A crop harvesting header comprising:

a frame for mounting on a crop harvesting machine for movement across ground carrying a crop to be harvested, the frame defining a working width of the header;

a table mounted on the frame across the width of the header for receiving the crop when cut for transportation along the header;

a cutting knife along a front edge of the table for cutting the crop;

and a pickup reel comprising:

a main elongate beam extending along the header generally parallel to the cutting knife;

at least two reel support arms spaced along the width of the frame, each having a rear end mounted on the frame for vertical pivotal movement providing adjustment for raising and lowering the reel relative to the cutting knife and a forward end for supporting the main elongate beam;

means mounting the main beam for rotation about a main longitudinal axis thereof;

a plurality of elongate bats;

means mounting the bats at angularly spaced positions around the main elongate beam for rotation therewith;

each bat having a plurality of fingers mounted at longitudinally spaced positions thereon for engaging the crop as the bats rotate with the main beam about the main longitudinal axis of the main beam while the crop enters the cutting knife and as the cut crop moves onto the table;

means mounting each bat for pivotal movement about a respective bat axis passing through the bat and parallel to the main longitudinal axis for varying an angle of the fingers relative to an axial plane containing the respective bat axis and the main longitudinal axis;

bat angle control means for controlling the angle of the fingers of each bat as said each bat rotates around the main longitudinal axis such that an angle of the fingers of each bat to a vertical plane containing the respective bat axis is maintained approximately equal to a predetermined angle as the bat is rotated from a first angular position of the bat adjacent the cutting knife to a second angular position of the bat rearward of the first position;

beam support means mounting the main elongate beam on the support arms for sliding adjustment movement forwardly and rearwardly on the support arms so as to adjust the horizontal position of the beam relative to the cutting knife;

each of the support arms being shaped and arranged such that said forward sliding movement changes an orientation of the bat angle control means about an axis parallel to said main longitudinal axis such that said forward sliding movement of the main elongate beam along the support arms increases said predetermined angle.

12. The header according to claim 11 wherein the beam support means and the support arms are arranged such that the angle remains constant for movement over a main portion of the support arms and increases only at a forward most portion thereof.

13. The header according to claim 11 wherein the bat angle control means is adjustable for adjusting said predetermined angle independently of movement of the main elongate beam along said support arms.

* * * * *